United States Patent [19]

Hubbard

[11] Patent Number: 4,632,062

[45] Date of Patent: Dec. 30, 1986

[54] SQUIRREL FEEDER

[76] Inventor: Jack E. Hubbard, 405 W. Lexington, Elkhart, Ind. 46516

[21] Appl. No.: 755,902

[22] Filed: Jul. 17, 1985

[51] Int. Cl.$^4$ .............................................. A01K 5/00
[52] U.S. Cl. .................................... 119/51 R; D30/14
[58] Field of Search .......................... 119/18, 29, 51 R; D30/14

[56] References Cited

U.S. PATENT DOCUMENTS

| | | | |
|---|---|---|---|
| D. 119,499 | 3/1940 | Howard | D30/14 |
| 1,751,388 | 3/1930 | Bircher | 119/51 R |
| 3,537,429 | 11/1970 | Regan | 119/51 R |
| 3,638,617 | 2/1972 | White | 119/51 R |

Primary Examiner—Robert P. Swiatek
Attorney, Agent, or Firm—Thomas J. Dodd; James D. Hall

[57] ABSTRACT

A squirrel feeder which includes a frame mounted to a support. A bar is rotatably connected to the frame and is adapted to carry a food item at an end of the bar.

1 Claim, 4 Drawing Figures

SQUIRREL FEEDER

SUMMARY OF THE INVENTION

This invention relates to a feeder for yard animals and will have specific application to a squirrel feeder.

Squirrels are by nature, playful animals with healthy appetites. The feeder of this invention is designed to allow the squirrel to play while it feeds by providing a rotatable bar which carries a food item. The bar is fastened to a support frame. As the squirrel makes a grab for the food, the bar rotates and swings the squirrel in an arc while the squirrel feeds on the attached food item.

Accordingly, it is an object of this invention to provide for a squirrel feeder which allows the squirrel to play while it feeds.

Another object of this invention is to provide for a squirrel feeder which is easy to assemble and is economical.

Other objects of this invention will become apparent upon a reading of the following description.

BRIEF DESCRIPTION OF THE DRAWINGS

A preferred embodiment of the invention has been depicted for illustrative purposes wherein.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize the invention.

Figure 2:
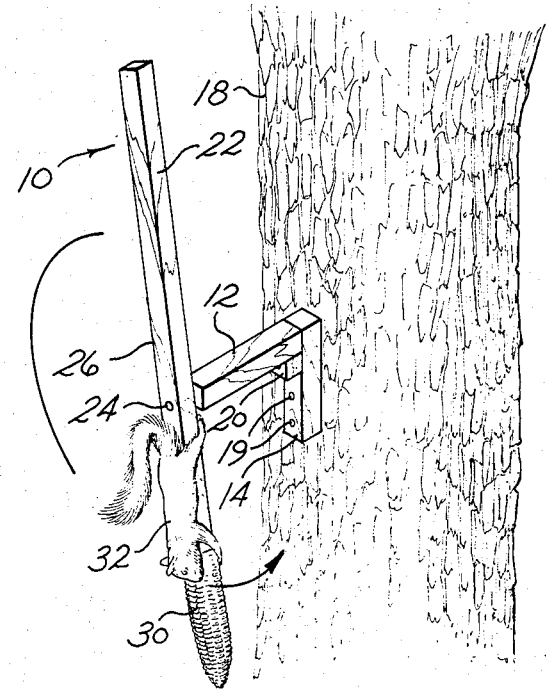
FIG. 2 is a perspective view of a squirrel using the feeder.
Figure 3:
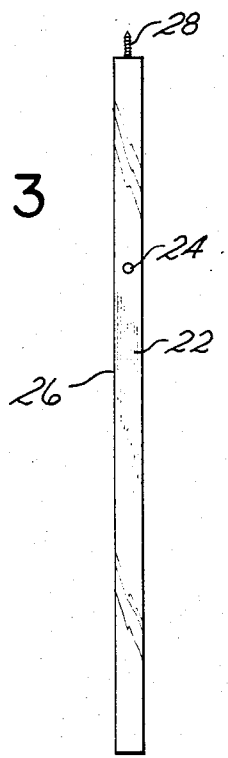
FIG. 3 is a front elevational view of the feeder with the food item removed.
Figure 4:
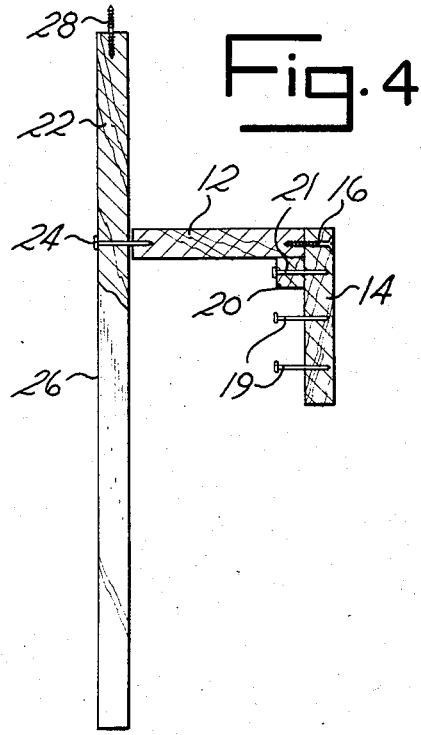
FIG. 4 is a side elevational view of the feeder with portions shown in section for illustrative purposes.

Squirrel feeder 10 shown in the drawings includes a frame having horizontal support member 12 and vertical support member 14 secured together by a fastener, such as screw 16. Support member 14 is fastened to a support, such as tree 18 by nails 19. A reinforcement block 20 may be fastened by nail 21 to bar 14 at the intersection of the members to provide additional support. An elongated bar 22 is rotatably connected to horizontal support member 12 by a pivot fastener, such as nail 24 which forms a pivot axis. Bar 22 is preferably positioned so that its midpoint 26 is offset from nail 24 and is rotatable about the nail. A threaded dowel 28 is secured to the end of bar 22 which is the nearest to pivot nail 24, as shown in FIG. 2.

Figure 1:
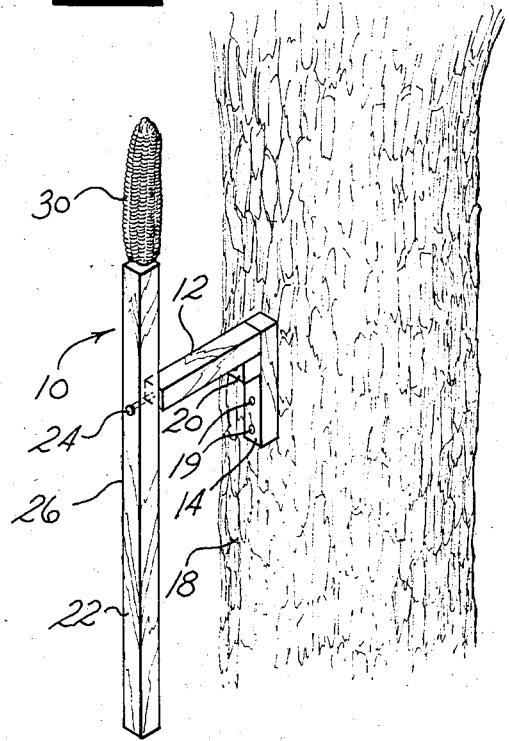
FIG. 1 is a perspective view of the feeder secured to a tree with the rotatable bar in a vertical orientation prior to squirrel contact.

FIG. 1 depicts the feeder 10 as used by a squirrel. With the feeder in the position of FIG. 2, a person affixes an item of food, such as ear of corn 30 to dowel 28. The offset of bar 22 relative to nail 24 monitors the bar in a vertical position with the corn 30 uppermost. When the squirrel 32 approaches the corn 30 and grabs for it, the weight of the squirrel causes bar 22 to drop and pivot or swing in an arc about nail 24. When the squirrel 30 has finished feeding and leaves bar 22, the bar returns automatically to the inoperative position of FIG. 1.

It is understood that the invention is not limited to the details above-given, but may be modified within the scope of the appended claims.

I claim:

1. A squirrel feeder comprising a stationary frame adapted for connection to a support, said frame including a protruding member, a bar member having opposite ends pivotally connected intermediate said ends to said protruding frame member for rotation relative to the frame member about a generally horizontal pivot axis, a retainer means connected to and extending from only one said end of said bar member for securing a food item to said bar member, said bar pivot axis being located nearer said one bar member end than the other bar member end.

* * * * *